United States Patent Office 2,813,024
Patented Nov. 12, 1957

2,813,024
PROTEIN FOOD PRODUCT

Mortimer Louis Anson, New York, N. Y., and Morton Pader, West Englewood, N. J., assignors to Lever Brothers Company, New York, N. Y., a corporation of Maine No Drawing. Application May 14, 1954,
Serial No. 429,981

6 Claims. (Cl. 99—14)

This application is a continuation-in-part of our copending application Serial No. 304,844, filed August 16, 1952.

The aforesaid copending application describes and claims the preparation from inexpensive protein sources of food products which simulate to a remarkable extent the chewiness, moistness, and texture of meat and meat products, both in the mouth and in appearance.

The present invention is directed especially to a protein food product which simulates the potted meat products or spreads such as deviled ham and meat paste which are commonly sold in food stores, and to a process for the preparation of such products.

The present commercial meat spreads are prepared from meat trimmings and meat by products. The meat and by products are usually precooked and then chopped to the desired consistency in a food cutter, seasoning ingredients being added in the course of the cutting operation. Broth or water is also added to adjust the consistency of the product to that desired. Sometimes cereal binders and preservatives are also incorporated. The chopped mixture is then heated in a steam jacketed kettle and filled into cans in conventional manner. Although the product contains an appreciable percentage of meat particles which are individually chewy, the particles are so small that the product itself is not chewy in the human mouth.

We have discovered that products very similar in nutritive value, taste, and texture to the ordinary meat spreads can be made from relatively inexpensive proteins isolated from such plentiful sources as the soybean and the peanut.

For the manufacture of such products, the present invention is particularly concerned with the utilization of gel precursors, such as those described in the aforesaid copending application. In accordance with the present invention, it has been found that highly acceptable protein food products simulating a meat spread can be prepared by a process which comprises, in indifferent order, the steps of comminuting a protein gel precursor into a mass of discrete particles whose greatest average diameter is less than about 1/32 inch, blending the particles with an edible outer additive and heating to convert the gel precursor into a chewy protein gel. Although the adjective "chewy" is used in describing the protein gel and is believed to be properly descriptive, it is not intended to imply that the final product is chewy since the small particle size of the gel prevents detection of chewiness in the human mouth.

The protein gel precursor used in the preparation of the protein food product of the invention can be prepared according to any of the general procedures described in the aforesaid copending application, Serial No. 304,844, filed August 16, 1952. There are, however, certain preferences involved in the selection of a gel precursor for use in this invention although these preferences are not invariably essential to the obtention of satisfactory products.

The first step in the preparation of the gel precursor is to isolate or obtain on the market an edible protein of good flavor and free from any substances which might inhibit the formation of a gel. Preferred sources of protein from which irreversible gels can be obtained are oilseeds such as the soybean and the peanut. In extracting the protein from oilseed meal, any method which does not adversely affect the flavor or gelling characteristics of the protein can be employed. In this connection it is pointed out that soy protein as it exists in soy meal contains a gel inhibitor of unknown composition which sometimes interferes with the gelation of isolated soy protein. This gel inhibitor can be eliminated by using a proper method of extraction. Several methods of extraction are known which we have found to yield good gelling protein. The following methods of extraction are those preferred in the present invention.

In the case of soy protein, a preferred extraction procedure devised by us comprises suspending flakes of soybean meal in an aqueous solution of calcium hydroxide 0.003 molar with respect to $Ca(OH)_2$. Steam is then sparged into the suspension of flakes, with agitation, until a temperature of about 60° C. is reached. The suspension is then pumped through a centrifuge to obtain a clarified extract which, in the usual instance, has a pH of about 6.8 to 6.9. This method gives essentially complete extraction of protein and provides protein of good quality. As a rule, other practical methods of extraction yield a poorer quality protein when the extraction is complete, and can yield good quality protein only at the expense of incomplete extraction.

The protein in the extract is then precipitated by the addition of acid, such as hydrochloric acid, to bring the pH to about 5 and subsequent centrifugation then yields a solid aqueous suspension of precipitated protein. Preferably, the precipitated protein is then resuspended in water for purposes of washing, and centrifuged again. The washed, precipitated protein can then be dried preparatory to making a gel precursor therefrom or it can be stored in the wet state. If the precipitated protein is to be kept for a long time, it is preferred to spray or tray dry the material for purposes of storage although the wet cake of precipitated protein can be stored at low temperatures for reasonable lengths of time.

Other methods of extraction and precipitation of soy protein which we have found to provide good gel-forming protein are also suitable. For example, a good protein can be obtained when soybean flakes are extracted in an aqueous 0.003 molar solution of calcium chloride at a pH of about 6.8 to 7. Another suitable extract method comprises washing soy meal with acidified water at a pH of about 4.8 followed by extraction of the protein in aqueous sodium hydroxide at a pH of about 7.2. Still another suitable method comprises extracting the protein from soy meal in cold water or in water at room temperature.

In the case of peanut protein, peanut meal can be suspended in a 0.0015 molar suspension of calcium chloride and passed through a colloid mill, brought to pH 6.8 with sodium hydroxide, and then clarified by centrifugation. The clarified extract is then acidified while held at a temperature ranging from room temperature up to about 95° C. in order to precipitate the protein. Good peanut protein can also be obtained by extraction of peanut meal in aqueous sodium hydroxide solution. Temperatures and pH's of the extraction and precipitation steps can be varied to modify the properties of the precipitated protein as desired. The choice of precipitation temperature depends primarily on the amount of structure desired in the gel precursor, the higher the temperature the greater the firmness of the precipitated protein in aqueous suspension.

In order to convert the precipitated protein into a gel precursor, it is usually necessary to adjust the pH and protein concentration which are the principal factors in influencing the subsequent formation of a chewy protein gel. For the purposes of the present invention, it is preferred that the gel precursor have a pH from about 6 to about 7.5 and a solids content of from about 14 to 35% by weight. The adjustment of pH and protein concentration ordinarily requires the addition of both water and alkali such as NaOH. In cases where the protein is dried prior to the preparation of a gel precursor therefrom, the adjustment of pH may be made at the time of drying.

By proceeding according to the above directions, there is obtained a protein gel precursor which varies in consistency from a semi-solid paste-like mass up to a firm, shapable solid according to the protein content of the gel precursor and its pH history, and the method by which the gel precursor was prepared.

In most cases, the protein gel precursor is too fluid to permit subdivision into small discrete particles and, for this reason, it is usually preferable to convert the gel precursor partially or completely into a chewy protein gel by the application of heat before further steps are taken. For this purpose, we prefer to steam the gel precursor until it has sufficient structure to be subdivided into discrete particles without coalescence of the particles. For this step temperatures in the order of 70° C. to about 120° C. can be employed and steam is the preferred heating medium since the use of steam avoids any substantial amount of dehydration.

After the preparation of the gel precursor and its partial or complete conversion to a chewy protein gel, the protein is next subdivided into a plurality of small discrete particles approximating the size of meat particles in ordinary potted meat spreads, and blended with an additive which serves as a binder for the gel particles. The outer additive normally comprises a mixture of materials. The order of these steps is not critical and often the subdivision and the blending with outer additive can be accomplished simultaneously in one operation.

One of the preferred ingredients of the outer additive for the manufacture of our protein food product is fat which may be used either as such or in the form of an aqueous emulsion. The edible animal and vegetable fats which are solid at room temperature are preferred. Excellent results have been achieved with hydrogenated vegtable, e. g., cotton seed oil, for example.

A fat-water emulsion is often preferred since such an emulsion generally gives the product a fatty, juicier taste than is obtained by the use of fat alone. When using a fat-water emulsion, the proportion of fat and water is preferably adjusted to give an emulsion of a semi-solid consistency.

Another preferred outer additive for binding purposes is an aqueous suspension of protein which can be converted into a weak gel by the application of heat. While the aqueous suspension of protein can be used alone as a binder, it is preferred to use it together with a larger amount of fat or an aqueous emulsion of fat. When using a protein suspension, the protein concentration of the suspension should be relatively low, i. e., about 15% at the maximum since this low concentration prevents the formation of a firm chewy gel. Such a protein suspension can be made in the same manner as the gel precursor but utilizing a relatively lower concentration of protein. Thus, the binding suspension of protein can be, in effect, a weak gel precursor.

When a protein suspension is used as a component of the outer additive it is also desirable to heat it to partial gelation as in the case of the gel precursor. In this manner, a better product is obtained which has a more moist taste than when the binding suspension of protein is not first partially gelled.

Flavoring and coloring additives are also desirable in order to simulate a potted meat. The coloring additives are normally incorporated in the gel precursor. Any of the dyes approved for use in food can be used.

On the other hand, it is preferred to incorporate flavoring additives in the outer additive since the flavor is more readily released when the product is eaten. Typical flavoring additives are smoked yeast, gluten hydrolozate, and salt. Both the flavoring and coloring additives are used in conventional small amounts.

The amount of outer additive relative to the gel precursor is not a critical feature of the invention but it is preferred that the product be comprised from about 25 to 75% by weight of chewy protein gel and from about 75 to 25% by weight of the outer additive. In making the product, the amounts of gel precursor and outer additive should be adjusted accordingly.

In the preferred method of making the product, the gel precursor or chewy protein gel as the case may be is simultaneously subdivided into the aforementioned small discrete particles and blended with the outer additive. This can be done conveniently by placing the gel precursor, in a state of partial or complete gelation, and outer additive in a conventional type of food cutter such as the Hobart mixer. The best results are obtained when the protein is cut into particles which have sharp, angular edges and food cutters of the Hobart type achieve this. Any desired size of particle can be obtained conveniently simply by regulation of the length of time the mixture is subjected to the action of the food cutter.

Following the blending and chopping operation, the resultant mixture is, in the ordinary case, canned. If the protein in the product has not been fully gelled, the product can be heated in the can to a temperature of at least about 100° C., for example, by boiling water or steam in order to complete the gelation.

In order to further illustrate the invention, the following examples are presented in which parts and percentages are by weight unless otherwise specified.

*Example 1*

Dry isolated soybean meal was prepared as follows:

A protein extract was prepared from edible grade soybean meal whose nitrogen was practically completely extractable. First, a 5% suspension of soy meal in an aqueous 0.003 M CaO solution was prepared. While the suspension was stirred gently, steam was introduced by means of a sparger until the temperature of the suspension was 60° C. The suspension was stirred for 5 minutes while at this temperature. It was then pumped to an efficient centrifuge where practically all of the insoluble matter was removed. The resulting extract contained over 90% of the nitrogen present in the soy meal originally.

The extract, which was at 45–60° C., was stirred vigorously, and approximately 3 N HCl was gradually added until the pH of the resulting slurry was lowered to 5.0. This precipitated the protein. The suspension of protein was then pumped to a basket centrifuge where it was collected as a wet cake containing about 20–30% protein. About 97% of the protein present in the extract was precipitated.

Finally the protein was washed at 60° C. The protein was next suspended in a volume of water approximately equal to that of the extract from which it was precipitated, and the slurry was passed between the rotor and the stator of a colloid mill in order to disperse the protein completely. The dispersion, as it was stirred, was then heated to 60° C. by means of steam, and, after it was at 60° C. for 5 minutes, it was pumped to a basket centrifuge. The protein was collected in the centrifuge as a white cake containing about 25–30% protein.

The protein cake was then dried. A quantity of the protein cake was placed in an efficient mixer and, while the cake was being mixed, a dilute aqueous solution of NaOH was added to raise the pH of the protein slurry to 7 and sufficient water to lower the protein content to about 10%. The mixture was then mixed until the protein was completely dispersed, and the resulting solution was spray dried.

A gel precursor was made from the dried protein preparation:

The dry soy protein preparation was placed in an efficient paste mixer. While the mixer was operating, there was added a volume of water sufficient to prepare a protein dispersion containing 18% protein. Then, a suitable amount of a red food dye was added and mixed in until the color of the mass was uniformly pink. The resulting gel precursor was a uniform, plastic mass.

The gel precursor was next converted to gel. The precursor was stuffed into molds about 4" x 4" x 6" and autoclaved at 5 p. s. i. g. for 2 hours. After cooling, the resultant gel was removed.

Next, a binding mixture was prepared as follows:

A gel precursor of low concentration was prepared exactly according to the above procedure except that the protein concentration was reduced to 12% by weight. A fat-water emulsion was prepared by mixing about 800 parts of hydrogenated vegetable oil with 400 ml. of water and 10 parts of emulsifier and passing the mixture through a colloid mill. There was then mixed into the emulsion about 20% of a flavoring mixture comprising smoked yeast and salt.

The fat-water emulsion and the weak gel precursor were then mixed in the proportion of 1100 parts of the former and 300 parts of the latter. This completed the preparation of the binding mixture.

Finally, the gel and binding mixture were blended and processed as follows:

About 1200 parts of gel (18% protein) were cut into roughly 1 inch cubes which were then mixed with 1400 parts of the binding mixture, and the resultant crude mixture was then blended in a Silent Cutter for about 10 minutes.

The blended mixture of gel and binding mixture was then heated and packed into jars. The mixture was heated to 180° F. in a steam jacketed vessel with efficient agitation and mixed while it was held at 180° F. for 15 minutes. Then, as it was agitated, the heated product was filled into sterilized glass jars and the jars were capped immediately.

The product was stored under refrigeration.

*Example 2*

Dry isolated soybean protein was prepared by extraction with water of soybean meal, clarification of the extract, precipitation of the protein from the extract by the addition of hydrochloric acid to pH 5, collection of the protein as a wet cake, washing of the cake, and finally drying of the cake in a forced air dryer at about 140° F. A gel precursor was then prepared from the dry isolated soybean preparation as follows: The dry soy protein preparation was placed in an efficient paste mixer. While the mixer was operating, there was added a volume of water sufficient to prepare a protein suspension containing slightly more than 24% protein. Mixing was continued until the suspension was uniform. Then, there was added a volume of dilute sodium hydroxide solution sufficient to raise the pH of the protein suspension to pH 6.5. (The quantity of water in the sodium hydroxide was just sufficient to lower the protein content of the mixture to 24%.) Next, a suitable amount of a concentrated dye solution was added and mixed in until the color of the mass was uniformly pink. The resulting gel precursor was a uniform, plastic mass.

The gel precursor was then placed into a tray as a layer about ½ inch thick and was then placed in a chamber into which live steam was introduced for a period of 10 minutes.

There was next prepared a binding mixture as follows: A gel precursor of low concentration was prepared exactly according to the above procedure except that the protein concentration was reduced to 15% by weight. A fat-water emulsion was prepared by mixing about 800 parts of hydrogenated vegetable oil with 400 ml. of water and passing the mixture through a colloid mill. There was then mixed into the emulsion about 20% of a flavoring mixture comprising smoked yeast and salt.

The fat-water emulsion and the weak gel precursor were then mixed in the proportion of 1100 parts of the former and 300 parts of the latter. This completed the preparation of the binding mixture.

About 1200 parts of the steamed gel precursor (24% protein) were cut into roughly 1 inch squares which were then mixed roughly with 1400 parts of the binding mixture and the resultant crude mixture was then blended in a Silent Cutter for about 15 minutes.

The blended mixture of steamed gel precursor and binding mixture was next heated to about 180° F. in a steam jacketed vessel with agitation and the hot mixture was then packed into several tin cans of about 6 ounce capacity, the cans were sealed, and then autoclaved for 30 minutes at 15 p. s. i. g.

After cooling, the cans were opened and the mixture therein was spread on crackers and eaten in the same way as potted meat is normally eaten. It compared very favorably with potted meat and possessed the nutritive value, taste and texture thereof.

We claim:

1. A protein food product resembling a meat spread comprising unstretched thermostable small discrete particles of hydrated unoriented chewy protein gel and an edible outer additive.

2. A protein food product resembling a meat spread comprising unstretched thermostable small discrete particles of hydrated unoriented chewy protein gel and an edible outer additive comprising fat.

3. A protein food product resembling a meat spread comprising unstretched thermostable small discrete particles of hydrated unoriented chewy protein gel and an edible outer additive comprising protein.

4. A protein food product resembling a meat spread comprising unstretched thermostable small discrete particles of hydrated unoriented chewy protein gel admixed with an edible outer additive comprising an aqueous emulsion of fat.

5. A protein food product resembling a meat spread comprising unstretched thermostable small discrete particles of hydrated unoriented chewy protein gel and an edible outer additive comprising an aqueous emulsion of fat and an aqueous dispersion of protein.

6. A protein food product resembling a meat spread comprising unstretched thermostable small discrete particles of hydrated unoriented chewy protein gel whose greatest average diameter is less than about 1/32 inch blended with an edible outer additive comprising an aqueous emulsion of fat and an aqueous suspension of protein.

References Cited in the file of this patent

UNITED STATES PATENTS

| | | |
|---|---|---|
| 670,283 | Kellogg | Mar. 19, 1901 |
| 869,371 | Kellogg | Oct. 29, 1907 |
| 2,560,621 | Wrenshall | July 17, 1951 |
| 2,682,466 | Boyer | June 29, 1954 |

FOREIGN PATENTS

| | | |
|---|---|---|
| 699,692 | Great Britain | Nov. 11, 1953 |